C. L. POOR.
NAVIGATION INSTRUMENT.
APPLICATION FILED JAN. 18, 1918.
1,289,905.
Patented Dec. 31, 1918.
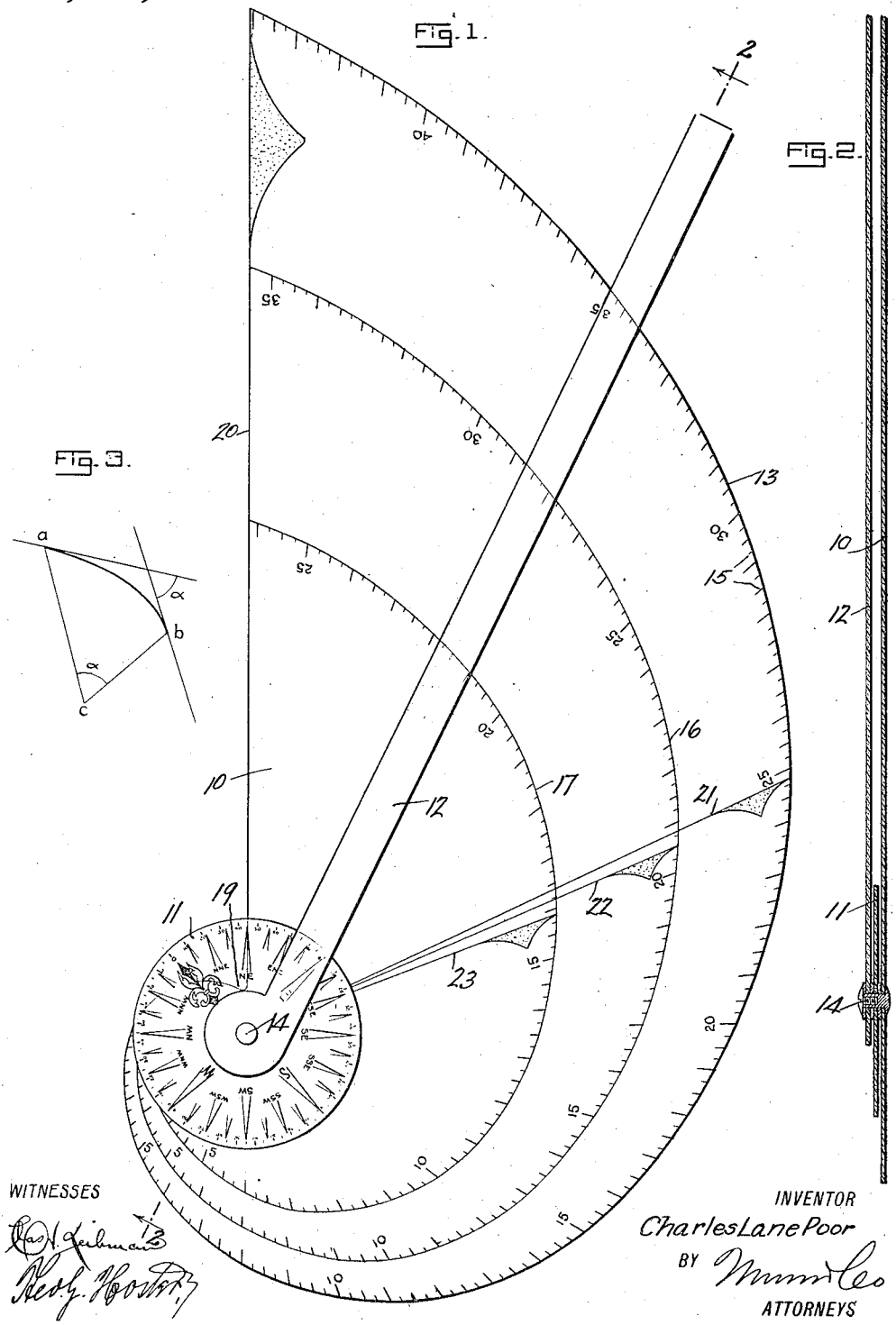
INVENTOR
Charles Lane Poor
BY
ATTORNEYS

UNITED STATES PATENT OFFICE.

CHARLES LANE POOR, OF SHELTER ISLAND, NEW YORK.

NAVIGATION INSTRUMENT.

1,289,905.  Specification of Letters Patent.  Patented Dec. 31, 1918.

Application filed January 18, 1918. Serial No. 212,438.

*To all whom it may concern:*

Be it known that I, CHARLES LANE POOR, a citizen of the United States, and a resident of Dering Harbor, Shelter Island, in the county of Suffolk and State of New York, have invented a new and Improved Navigation Instrument, of which the following is a full, clear, and exact description.

The invention relates to aerial and marine navigation, and its object is to provide a new and improved navigation instrument more especially designed for directing a vessel on a spiral course known as a "search curve" or on any portion of such course, or upon an irregular, broken course composed of sections of said spiral curve.

The invention is based on two principles of logarithmic spirals, namely: first, the angle between the radius drawn from the center to a point on the curve, and the line tangent to the curve at this point is constant and the same for every point of the curve, and, second, the length of the arc of the curve between any two points is a constant multiple of the difference between the length of the radii drawn to the ends of the arc. If a vessel on the sea or in the air sails along the arc of the curve shown in Fig. 3 from $a$ to $b$ then the change in the course sailed is exactly equal to the angle $\alpha$ and this quality of change of course or direction with the angle $\alpha$ at the center is maintained under all conditions of speed and in whichever direction the vesesl may proceed along the spiral curve forward or backward. In order to utilize these principles and direct a vessel to follow a course corresponding to such spiral curve, use is made of a miniature representation of the spiral course to be sailed and direction indicating means adapted to be set on the said spiral curve to the constant angle thereof, the said direction indicating means when set indicating the direction at every point of the curve. Use is also made of a distance indicating means adapted to indicate on the said representation of the spiral curve the distance sailed at the time, and indicating on the said direction indicating means the course to be sailed.

A practical embodiment of the invention is represented in the accompanying drawings forming a part of this specification, in which similar characters of reference indicate corresponding parts in all the views.

Figure 1 is a plan view of the navigation instrument;

Fig. 2 is a sectional side elevation of the same on the line 2—2 of Fig. 1; and

Fig. 3 is a diagrammatic view of a portion of the spiral curve.

The navigation instrument in its general construction consists of a body 10, a compass card 11 overlying the body 10, and an indicating arm 12 overlying the compass card 11 and extending to the edge of the body 10. The body 10 is in the form of a sheet of celluloid or other suitable material, and its contour represents a logarithmic spiral or a "search curve" 13, at the center of which is arranged a pivot 14 on which the compass card 11 is mounted to turn, and the arm 12 is mounted to swing. The search curve 13 is a miniature representation of the spiral course to be sailed by the vessel and it is provided with a graduation 15 representing time or a linear measurement such as nautical miles and subdivisions. As shown, the length of the spiral course is 44 miles, but it is expressly understood that the course may be laid out any desired length. A series of smaller search curves 16, 17 are produced on the face of the body 10 representing courses of correspondingly less length than the course represented by the curve 13, but the several curves have a common starting point at 19 and end in a radial direction line 20, which, as shown, forms part of the edge of the body 10. Radial angle or setting lines 21, 22 and 23 extend to the several curves from the common center thereof and represent with the direction line 20 the constant angle of the intended course.

The navigation instrument is used by an officer on board of a vessel and it enables such officer to give the proper directions to the helmsman with a view to accurately steer the vessel along the selected spiral course. Presuming that the vessel is to sail a spiral course represented by the spiral curve 13 and with the end of the course to be northeast from the vessel's starting position. The officer in charge of the instrument turns the compass card 11 until NE coincides with the line 21, thus indicating on the compass card at the starting point 19 of the curve 13 the direction NNW in which the vessel is to head. A corresponding order is given by the officer to the helmsman. It is understood that the vessel is started on an NNW course but the course is quickly changed to NWbN, NWbW, and so on, as the vessel proceeds on the sharp curvature of the beginning portion of the curve, but the change is gradually less rapid as the vessel proceeds on the spiral course laid. It is also understood that the curve 13 is intersected by continuations of the points of the compass card to indicate at the corresponding distance the course to be sailed. To facilitate this reading, the arm 12 is used to form the continuations of the points of the compass card. For instance, after the vessel has sailed, say, five miles, the officer swings the arm 12 around to the five mile mark of the graduation 15, and reads on the intersected edge of the compass card the direction SSW in which the vessel is to sail. This operation is repeated as the vessel proceeds on its course, that is, the officer in charge of the instrument swings the arm around to the distance mark on the graduation 15 corresponding to the distance sailed by the vessel at the time.

Presuming that the vessel is to sail a spiral course represented by the spiral curve 17, the end of the course being assumed to be ESE from the vessel's starting position. The officer in charge of the instrument turns the compass card 11 around until ESE coincides with the line 23, as shown in Fig. 1, thus indicating on the compass card at the starting point 19 of the curve 17 the direction NE in which the vessel is to head. The vessel's course is directed as above described by the officer reading off the direction at the intersected compass points with the curve.

From the foregoing it will be seen that by the use of this navigation instrument a vessel can be accurately sailed along a predetermined spiral course. It will also be noticed that the instrument is exceedingly simple in construction and easily manipulated even by a person not necessarily highly skilled in the art of navigation.

Having thus described my invention, I claim as new and desire to secure by Letters Patent:—

1. A navigation instrument for guiding a vessel on a logarithmic spiral course, comprising a flat body provided with a miniature representation of the logarithmic spiral course to be sailed, and direction indicating means associated with the said flat body to indicate the course to be sailed at every point of the said logarithmic spiral course.

2. A navigation instrument for guiding a vessel on a logarithmic spiral course, comprising a flat body provided with a miniature representation of the logarithmic spiral course, a manually controlled direction indicator mounted on the said flat body and centrally disposed relative to the said miniature logarithmic spiral course to indicate at every point thereof the course to be sailed, and manually controlled distance indicating means indicating on the said miniature representation of the logarithmic spiral course the distance sailed at a time and indicating on the said direction indicator the course to be sailed.

3. A navigation instrument for guiding a vessel over one of several spiral courses, comprising a flat body provided with a plurality of logarithmic spiral curves having a common center and representing the spiral courses, the coinciding beginning points and the coinciding end points of the curves being connected with each other by a radial direction line, radial setting lines extending from the center to the curves to indicate with the said direction line the constant angle for the corresponding curve, and a revoluble compass card mounted centrally relative to the said curves and adapted to be set to the constant angle of the intended course.

4. A navigation instrument, comprising a flat body provided with a logarithmic spiral curve and a manually controlled compass card mounted to turn on the said body and centrally relative to the said curve, the said compass card being adapted to be set to indicate the intended course to be sailed and represented by the said curve.

5. A navigation instrument, comprising a flat body provided with a logarithmic spiral curve and a manually controlled compass card mounted to turn on the said body and centrally relative to the said curve, the said compass card being adapted to be set to indicate the intended course to be sailed and represented by the said curve, the curve being provided with a graduation representing linear measurement, and an indicating arm mounted to swing centrally on the said body and adapted to indicate on the graduation the distance sailed at a time and to indicate on the compass card the course to be sailed.

6. A navigation instrument comprising a flat body provided with a logarithmic spiral curve representing the course to be sailed by a vessel, the beginning and end points of the curve being connected with each other by a radial direction line, a radial setting line indicating with the said direction line the constant angle of the curve, a compass card mounted to turn on the said body and centrally relative to the center of the said curve, the said compass card being adapted to be set relative to the said radial lines to the constant angle of the intended course represented by the said curve.

7. A navigation instrument, comprising a flat body provided with a logarithmic spiral curve representing the course to be sailed by a vessel, the beginning and end points of the curve being connected with each other by a radial direction line, a radial setting line indicating with the said direction line the constant angle of the curve, a compass card mounted to turn on the said body and centrally relative to the center of the said curve, the said compass card being adapted to be set relative to the said radial lines to the constant angle of the intended course represented by the said curve, the said curve being provided with a graduation representing linear measurement, and an indicating arm mounted to swing centrally on the said body and adapted to indicate on the said graduation the distance sailed at the time to indicate on the compass card the course to be sailed.

8. In a navigation instrument, a body provided with a search curve representing a search course to be sailed by a vessel, and radial lines from the center of the curve to points on the curve indicating the constant angle thereof.

9. In a navigation instrument, a body provided with a search curve representing a search course to be sailed by a vessel, radial lines from the center of the curve to points on the curve indicating the constant angle thereof, and a graduation arranged along the curve representing a linear measurement.

10. In a navigation instrument, a body having a portion of its edge representing a search curve and having another portion of its edge representing a radial direction line, a series of search curves on the face of the body and having their centers coinciding with the center of the said edge search curve, and a series of radial lines from the common center of the said curves to points on the said curves to indicate with the said radial direction line the constant angles of the several search curves.

CHARLES LANE POOR.

Copies of this patent may be obtained for five cents each, by addressing the "Commissioner of Patents Washington, D. C."